(12) United States Patent
Gong et al.

(10) Patent No.: US 12,549,852 B2
(45) Date of Patent: Feb. 10, 2026

(54) AUTO-FOCUSING METHOD AND APPARATUS, ELECTRONIC DEVICE, AND MEDIUM

(71) Applicant: ZHEJIANG UNIVIEW TECHNOLOGIES CO., LTD., Zhejiang (CN)

(72) Inventors: Zhidong Gong, Zhejiang (CN); Fei Shi, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 186 days.

(21) Appl. No.: 18/260,187

(22) PCT Filed: Dec. 8, 2021

(86) PCT No.: PCT/CN2021/136267
§ 371 (c)(1),
(2) Date: Jun. 30, 2023

(87) PCT Pub. No.: WO2022/143053
PCT Pub. Date: Jul. 7, 2022

(65) Prior Publication Data
US 2024/0056684 A1     Feb. 15, 2024

(30) Foreign Application Priority Data

Dec. 30, 2020  (CN) .......................... 202011607244.8

(51) Int. Cl.
*H04N 23/67*       (2023.01)
*G06T 7/246*       (2017.01)
*H04N 23/61*       (2023.01)

(52) U.S. Cl.
CPC ........... *H04N 23/675* (2023.01); *G06T 7/248* (2017.01); *H04N 23/61* (2023.01)

(58) Field of Classification Search
CPC ... G06T 7/248; G06T 7/11; G06T 7/38; G06T 7/80; G06T 7/187; G06T 7/571;
(Continued)

(56) References Cited

U.S. PATENT DOCUMENTS 6,088,539 A  *  7/2000  Aoyama ................. G02B 7/34
                                                    396/123
8,340,512 B2 * 12/2012  Garg, I ................... G02B 7/34
                                                    396/79
(Continued)

FOREIGN PATENT DOCUMENTS

CN         103424953 A      12/2013
CN         104079832 A      10/2014
(Continued)

OTHER PUBLICATIONS

Extended European Search Report for Application No. 21913794.0, dated Nov. 19, 2024, 10 pages.
(Continued)

*Primary Examiner* — Pritham D Prabhakher
(74) *Attorney, Agent, or Firm* — MASCHOFF BRENNAN

(57) ABSTRACT

Provided are an auto-focusing method and apparatus, an electronic device, and a medium. The method includes: determining image block change information of a current frame image relative to a reference frame image in a scene monitoring area, where the scene monitoring area includes a pre-divided image effective area in a photographing picture; determining, according to the image block change information, whether to trigger a focusing operation on the scene monitoring area; and in response to determining to trigger the focusing operation, determining a focusing area of interest triggered by the movement of an object relative
(Continued)

to the scene monitoring area, and performing the focusing operation on the focusing area of interest.

17 Claims, 5 Drawing Sheets

(58) Field of Classification Search
CPC .... H04N 23/61; H04N 23/675; H04N 23/635; H04N 23/673; H04N 23/631; H04N 23/54
USPC .................................................... 348/207.99
See application file for complete search history.

(56) References Cited

U.S. PATENT DOCUMENTS

| | | | | |
|---|---|---|---|---|
| 9,319,580 | B2* | 4/2016 | Choi | H04N 23/675 |
| 9,621,785 | B2* | 4/2017 | Chang | H04N 23/676 |
| 9,686,463 | B2* | 6/2017 | Deng | G06T 7/80 |
| 10,547,774 | B2* | 1/2020 | Kinoshita | H04N 23/69 |
| 11,689,805 | B2* | 6/2023 | Imamiya | H04N 23/675 348/207.99 |
| 2008/0226278 | A1 | 9/2008 | Garg et al. | |
| 2014/0139721 | A1 | 5/2014 | Choi | |
| 2015/0312469 | A1 | 10/2015 | Chang et al. | |
| 2015/0350523 | A1* | 12/2015 | Kinoshita | G06T 5/70 348/352 |
| 2016/0269615 | A1 | 9/2016 | Deng et al. | |
| 2017/0257557 | A1* | 9/2017 | Trusten | H04N 23/64 |
| 2019/0394395 | A1* | 12/2019 | Kamiya | G03B 17/18 |
| 2020/0404156 | A1* | 12/2020 | Aoki | H04N 23/672 |
| 2021/0120170 | A1* | 4/2021 | Imamiya | G06T 7/20 |

FOREIGN PATENT DOCUMENTS

| | | |
|---|---|---|
| CN | 105262954 A | 1/2016 |
| CN | 105472250 A | 4/2016 |
| CN | 105635554 A | 6/2016 |
| CN | 107124556 A | 9/2017 |
| CN | 107888819 A | 4/2018 |
| CN | 108496350 A | 9/2018 |
| CN | 111131717 A | 5/2020 |
| CN | 113572958 A | 10/2021 |
| JP | 2003015026 A | 1/2003 |

OTHER PUBLICATIONS

International Search Report in Application No. PCT/CN2021/136267, dated Feb. 23, 2022, 5 pages, including translation.
Chinese Search Report in Application No. 202116072448, dated Oct. 11, 2022, 2 pages.
Chinese Office Action in Application No. 202011607244.8 dated Oct. 19, 2022, 10 pages, including translation.

* cited by examiner

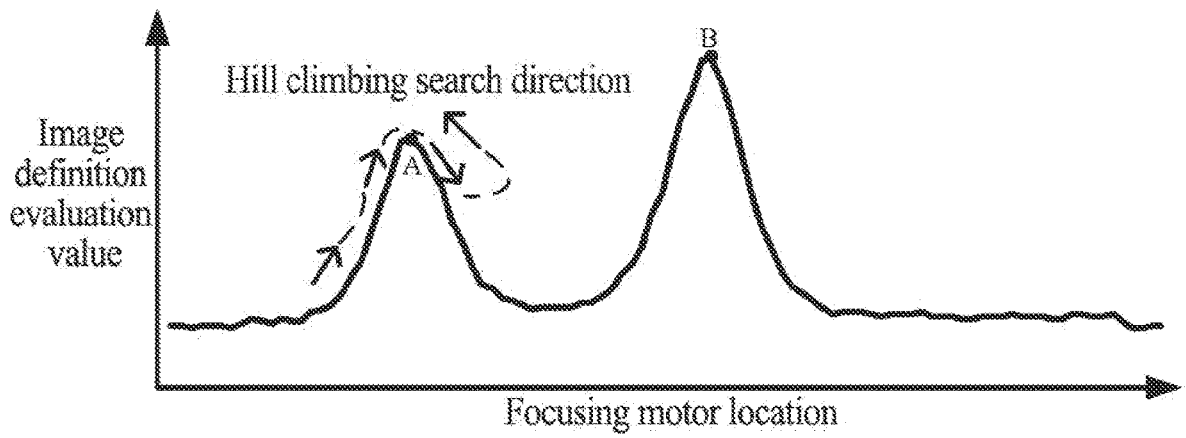

FIG. 1

```
┌─────────────────────────────────────────────────────────────┐
│ Determine image block change information of a current frame │
│ image relative to a reference frame image in a scene        │──S210
│ monitoring area, where the scene monitoring area includes   │
│ a pre-divided image effective area in a photographing       │
│ picture                                                     │
└─────────────────────────────────────────────────────────────┘
                              │
                              ▼
┌─────────────────────────────────────────────────────────────┐
│ Determine whether to trigger focusing on the scene          │──S220
│ monitoring area according to the image block change         │
│ information in the scene monitoring area                    │
└─────────────────────────────────────────────────────────────┘
                              │
                              ▼
┌─────────────────────────────────────────────────────────────┐
│ If it is determined to trigger focusing on the scene        │
│ monitoring area, determine a focusing area of interest      │──S230
│ triggered by the movement of an object relative to the      │
│ scene monitoring area, and perform a focusing operation     │
│ on the focusing area of interest                            │
└─────────────────────────────────────────────────────────────┘
```

FIG. 2

AUTO-FOCUSING METHOD AND APPARATUS, ELECTRONIC DEVICE, AND MEDIUM

CROSS REFERENCE TO RELATED APPLICATIONS

This is a National Stage Application filed under 35 U.S.C. 371 based on International Patent Application No. PCT/CN2021/136267, filed on Dec. 8, 2021, which claims priority of Chinese Patent Application No. 202011607244.8 filed with the China National Intellectual Property Administration (CNIPA) on Dec. 30, 2020, the disclosures of which are incorporated herein by reference in their entireties.

This application claims priority of Chinese Patent Application No. 202011607244.8 filed with the China National Intellectual Property Administration (CNIPA) on Dec. 30, 2020, the disclosure of which is incorporated herein by reference in its entirety.

TECHNICAL FIELD

Embodiments of the present application relate to the field of video imaging, for example, an auto-focusing method and apparatus, an electronic device, and a medium.

BACKGROUND

With the development and popularization of communication technology, stable image and sound signal transmission provides a solid foundation for teleconference and distance education. When videoconferencing and distance education are applied in indoor scenes, video equipment often needs to be configured in a state of a telephoto end.

However, in the state of a telephoto end, the depth of field of the image becomes smaller as the focal length becomes longer. At this point, both the object and the background are hardly kept clear. Therefore, the overall image is prone to have a double-wave peak, as shown in FIG. 1. As for the focusing result, the focusing algorithm based on the hill climbing method in the related art concentrates on whether the overall image is clear but does not concentrate on whether the image clear area after the focusing is in the focusing area of interest. In particular, when the equipment is at a large magnification, the depth of field of the image becomes shallow, so that the background and the object cannot be kept clear at the same time, causing a problem that the clear point of the focused image are always on the background instead of the focusing area of interest.

SUMMARY

The embodiments of the present application provide an auto-focusing method and apparatus, an electronic device, and a medium to achieve stable and efficient focusing on an object moving into or out of a picture or moving in the picture in a case where the depth of field at a telephoto end is small.

In a first aspect, the embodiments of the present application provide an auto-focusing method. The method includes the following steps.

Image block change information of a current frame image relative to a reference frame image in a scene monitoring area is determined, where the scene monitoring area includes a pre-divided image effective area in a photographing picture.

Whether to trigger a focusing operation on the scene monitoring area is determined according to the image block change information.

In response to determining to trigger the focusing operation, a focusing area of interest triggered by the movement of an object relative to the scene monitoring area is determined, and the focusing operation is performed on the focusing area of interest.

In a second aspect, the embodiments of the present application provide an auto-focusing apparatus. The apparatus includes a block change monitoring module, a focusing trigger determination module, and a focusing trigger processing module.

The block change monitoring module is configured to determine image block change information of a current frame image relative to a reference frame image in a scene monitoring area, where the scene monitoring area includes a pre-divided image effective area in a photographing picture.

The focusing trigger determination module is configured to determine, according to the image block change information, whether to trigger a focusing operation on the scene monitoring area.

The focusing trigger processing module is configured to, in response to determining to trigger the focusing operation, determine a focusing area of interest triggered by the movement of an object relative to the scene monitoring area, and perform the focusing operation on the focusing area of interest.

In a third aspect, the embodiments of the present application further provide an electronic device.

The electronic device includes at least one processing apparatus and a storage apparatus.

The storage apparatus is configured to store at least one program.

The at least one program, when executed by the at least one processing apparatus, enables the at least one processing apparatus to implement the auto-focusing method provided in any one of embodiments of the present application.

In a fourth aspect, the embodiments of the present application further provide a computer-readable storage medium. The computer-readable storage medium is configured to store a computer program, and the computer program, when executed by a processing apparatus, is configured to implement the auto-focusing method provided in any one of embodiments of the present application.

BRIEF DESCRIPTION OF DRAWINGS

Like reference numerals in the drawings denote like components. In the drawings:

FIG. 1 is a schematic diagram of the impact curve of a double-wave peak phenomenon on a hill climbing-based focusing algorithm according to an embodiment of the present application;

FIG. 2 is a flowchart of an auto-focusing method according to an embodiment of the present application;

DETAILED DESCRIPTION

Before example embodiments are discussed in more detail, it is to be noted that some of the example embodiments are described as processing or methods depicted in flowcharts. Although a flowchart may describe the operations (or steps) as a sequential process, many of the operations (or steps) may be performed in parallel, concurrently, or simultaneously. Additionally, the sequence of the operations may be rearranged. The processing may be terminated when the operations are completed but may also have additional steps not included in the figure. The processing may correspond to a method, a function, a procedure, a subroutine, a subprogram or the like.

To better understand the solutions of the present application, as shown in FIG. 1, the focusing problem in the related art is illustrated. For example, in a scene where the background is complex, the peak A in the overall image definition evaluation value at a telephoto end may be the location of a focusing motor when the focusing area of interest is clear, and the global search focusing algorithm or a hill climbing search algorithm with the initial search point near the peak B in the related art may not satisfy the requirements. At this point, the focusing amplitude is increased when only the search area of the algorithm is enlarged or when the convergence condition of the algorithm is relaxed, resulting in a long blurring time of the scene, and the background with rich details is concentrated at a high probability, affecting the use effect of the device. Therefore, how to make the focusing area of interest to be concentrated on in the monitoring and focusing process to eliminate the double-wake peak phenomenon of the definition evaluation value becomes particularly important.

The auto-focusing method and apparatus, electronic device and storage medium provided in the solutions of the present application are described in detail in the following embodiments and example solutions thereof.

FIG. 2 is a flowchart of an auto-focusing method according to an embodiment of the present application. The embodiment of the present application may be applicable to a case of performing auto-focusing on a focusing area of interest with an indefinite size in the focusing process when the depth of field of a device at a telephoto end is small. The method may be performed by an auto-focusing apparatus, and the apparatus may be implemented by software and/or hardware and is integrated into any electronic device having a network communication function. As shown in FIG. 2, the auto-focusing method provided in the embodiment may include steps S210, S220 and S230.

In S210, image block change information of a current frame image relative to a reference frame image in a scene monitoring area is determined, where the scene monitoring area includes a pre-divided image effective area in a photographing picture.

Figure 3:
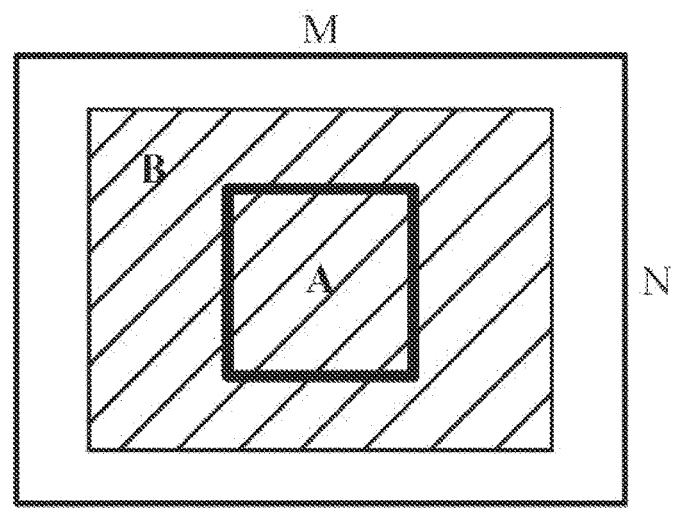
FIG. 3 is a schematic diagram of an area division of a photographing picture based on the degree of attention according to an embodiment of the present application.

In the embodiment, FIG. 3 is a schematic diagram of an area division of a photographing picture based on the degree of attention according to an embodiment of the present application. The photographing picture may be pre-divided into M*N blocks, each frame of image obtained in the photographing picture may be divided into M*N image blocks, and image block features of each image block may be subsequently counted according to different image block locations. When the previous focusing is completed and the current focusing monitoring phase is entered, a current frame image obtained in the photographing picture may be acquired in real time, and a frame of a stable image in the photographing picture is acquired after the previous focusing is completed and is used as a reference frame image. The stable image is an image in which most of the consecutive multiple frames are consistent in the image block color and the image block definition evaluation value.

In the embodiment, with reference to FIG. 3, when the scene of the photographing picture is monitored, the scene change of the overall photographing picture is not monitored, but the scene change of one scene monitoring area selected from the photographing picture is mainly monitored. In this manner, at least one area with high sensitivity or a high degree of attention is divided in the photographing picture so that such the area with a high degree of attention is subsequently used as the scene monitoring area to monitor the scene changes of the picture.

For example, with reference to FIG. 3, an image core area A and an image effective area B may be divided in the photographing picture. The image effective area B and the image core area A belong to areas with high sensitivity or a high degree of attention in the focusing process, but the image core area A is included in the image effective area B and has a higher degree of attention compared with the image effective area B. Considering that the image effective area B divided in the scene of the photographing picture belongs to the area with a high degree of attention, the image effective area B may be used as the scene monitoring area by default. The scene monitoring area is a dynamically changing area, and if the degree of attention is changed in the subsequent process, an area with a higher degree of attention after updating may replace the image effective area B as the scene monitoring area.

In the embodiment, with reference to FIG. 3, the current frame image and the reference frame image obtained in the photographing picture are each divided into M*N image blocks according to a block division rule of the photographing picture, each image block has a unique image block location in the frame image to which the image block belongs, and image blocks involved in the current frame image and the reference frame image may be located through the image block locations. Since the scene change of the photographing picture is monitored in the scene monitoring area through the current frame image and the reference frame image photographed in the photographing picture, the change between an image block of the current frame image mapped at the same image block location and an image block of the reference frame image mapped at the same image block location in the scene monitoring area may be calculated, that is, the image block change information of the current frame image relative to the reference frame image at each image block location may be counted, and the change of the photographing picture monitored in the scene monitoring area may be indicated through the counting result.

In S220, whether to trigger focusing on the scene monitoring area is determined according to the image block change information in the scene monitoring area.

In the embodiment, the conditions for determining whether to trigger focusing on the scene monitoring area may include, but are not limited to, whether the photographing picture in the scene monitoring area obviously changes (that is, whether the change degree of the photographing picture in the scene monitoring area is obvious) and whether the change trend of the photographing picture in the scene monitoring area is consistent as a whole (that is, whether the change trend of the current frame image relative to the reference frame image is consistent as a whole). Whether the scene monitoring area satisfies the preceding conditions may be determined through the image block change information of the current frame image relative to the reference frame image in the scene monitoring area.

In S230, if it is determined to trigger focusing on the scene monitoring area, a focusing area of interest triggered by the movement of an object relative to the scene monitoring area is determined, and a focusing operation is performed on the focusing area of interest.

Figure 4:
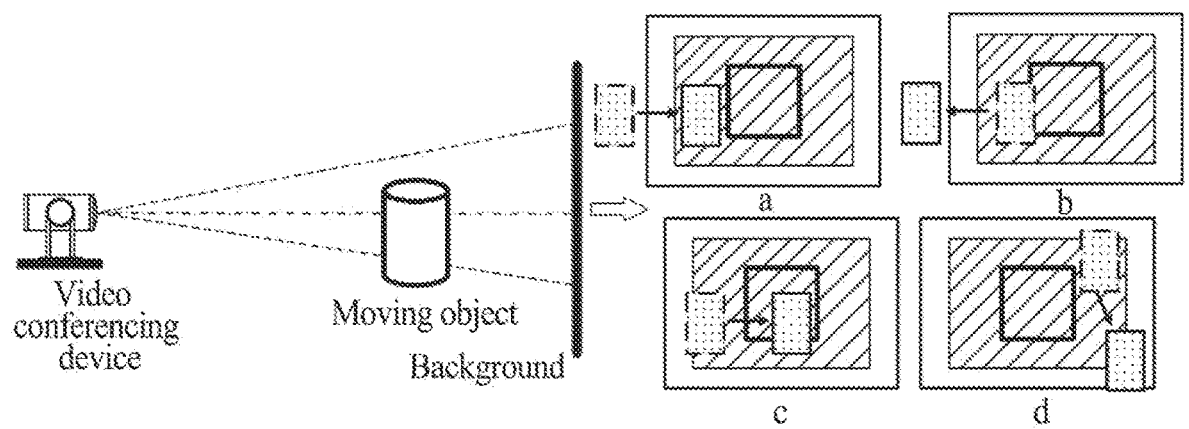
FIG. 4 is a schematic diagram of a division of common scenes in the focusing process according to an embodiment of the present application.

In the embodiment, FIG. 4 is a schematic diagram of a division of common scenes in the focusing process according to an embodiment of the present application. The following is described using an indoor videoconferencing device as an example. When the videoconferencing device is set to be in a state of a telephoto end, it is assumed that a photographing picture of the reference frame image is the background. When the object moves into the scene monitoring area (which, at this point, is the image effective area B) of the photographing picture and the image is stabilized, as shown in FIG. 4, in either the case a where the object moves into the scene monitoring area in the photographing picture or the case b where the object moves out of the scene monitoring area in the photographing picture, the obtained image block change information of the current frame image relative to the reference frame image in the scene monitoring area may trigger focusing on the scene monitoring area. At this point, an area where the picture in the scene monitoring area obviously changes when the object moves into or out of the scene monitoring area may be used as the focusing area of interest triggered by the movement of the object relative to the scene monitoring area. The focusing area of interest dynamically changes according to the background content of the picture in the scene monitoring area and the object moving into or out of the picture of the scene monitoring area.

In the embodiment, after the focusing area of interest triggered by the movement of the object relative to the scene monitoring area is determined, focusing may be performed on the focusing area of interest based on a hill climbing-based focusing algorithm to enable the clear point of the focused image to be always in the focusing area of interest, thereby ensuring that the focusing area of interest is mainly concentrated on in the focusing process. In this manner, the focusing amplitude can be increased because the search area of the algorithm does not need to be enlarged or the convergence condition of the algorithm does not need to be relaxed; therefore, the blurring time of the scene can be shortened, and the focusing area of interest is more concentrated on at a high probability, thereby improving the problem that the object cannot be stably and efficiently focused when the object moves into or out of the picture or moves in the picture in a case where the depth of field at a telephoto end in videoconferencing is small. For example, for the case a, the location of the focusing motor corresponding to the clear point of the object when the object moves into the photographing picture to which the scene monitoring area belongs can be found more quickly, effectively and steadily in the search, achieving the auto-focusing of the object in the area where the object is currently located; for the case b, the clear point of the object can be effectively focused on the background after the object moves out of the scene monitoring area, achieving the auto-focusing at the location where the object is located on the background before moving out.

According to the auto-focusing method in the embodiment of the present application, the scene change monitoring of the picture is performed in real time in the scene monitoring area so that the focusing operation can be triggered accurately when the object moves out of the photographing picture or moves in the photographing picture; the focusing operation is performed on the focusing area of interest triggered by the movement of the object relative to the scene monitoring area so that the problem that the auto-focusing cannot concentrate on the requirement to trigger the focusing of the object on a complex background can be solved, thereby stably, efficiently and clearly focusing the object.

Figure 5:
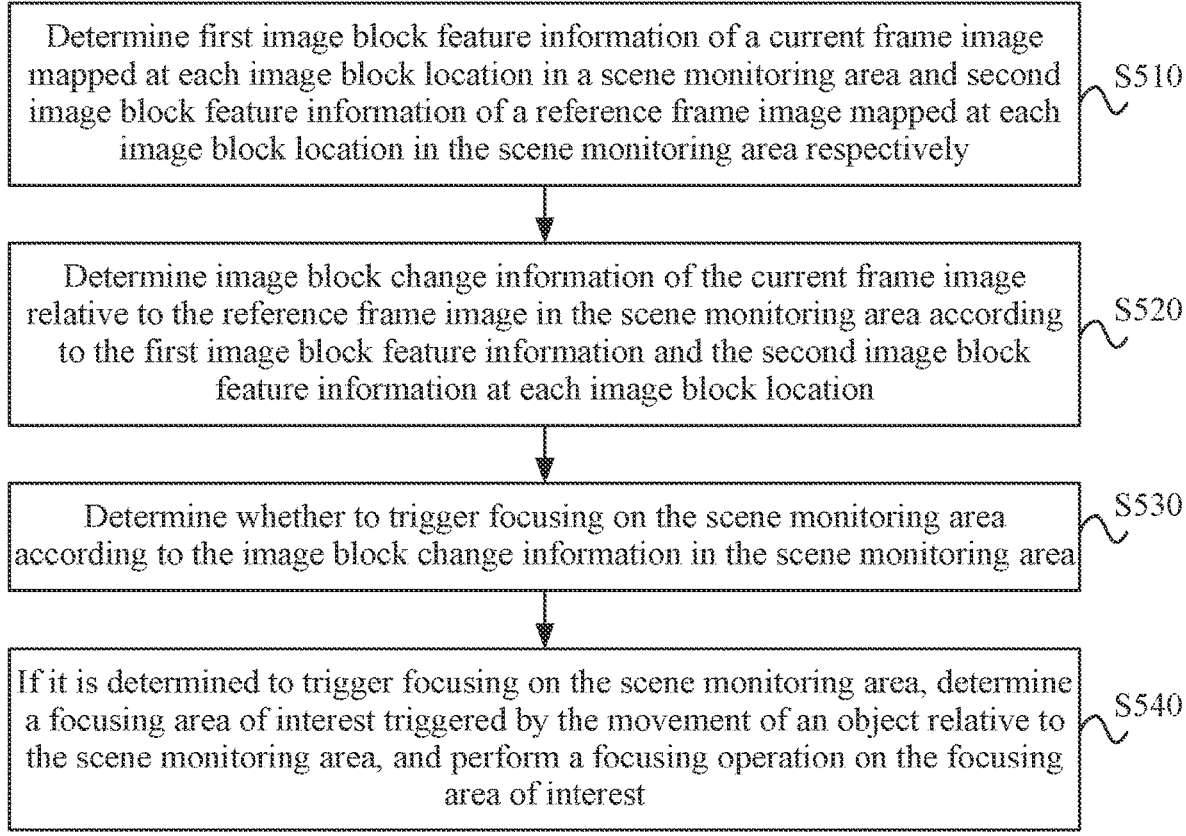
FIG. 5 is a flowchart of another auto-focusing method according to an embodiment of the present application.

FIG. 5 is a flowchart of another auto-focusing method according to an embodiment of the present application. The embodiment of the present application is optimized based on the preceding embodiments, and the embodiment of the present application may be combined with various example solutions in one or more of the preceding embodiments. As shown in FIG. 5, the auto-focusing method provided in the embodiment of the present application may include steps S510, S520, S530 and S540.

In S510, first image block feature information of a current frame image mapped at each image block location in a scene monitoring area and second image block feature information of a reference frame image mapped at each image block location in the scene monitoring area are determined respectively.

The scene monitoring area includes an image effective area pre-divided in the photographing picture, and the image block feature information each includes an image block definition evaluation value and an image block color evaluation value.

In the embodiment, an image block corresponding to each image block location in an area where the current frame image is mapped onto and overlapped with the scene monitoring area is denoted as a first image block, and an image block corresponding to each image block location in an area where the reference frame image is mapped onto and overlapped with the scene monitoring area is denoted as a second image block. For the current frame image and the reference frame image, the first image block feature information of the current frame image and the second image block feature information of the reference frame image may be obtained at the same image block location. The image block feature is represented using the image block definition evaluation value and the image block color evaluation value.

In the embodiment, for the image block definition evaluation value, the definition value mainly comprises pieces of high-frequency information of the divided M*N image blocks. The high-frequency information of each image block can effectively represent the degree of detail richness of the image block, and thus the definition of the image block can be evaluated using the high-frequency information of the image block. For the image block color evaluation value, the color information is extracted from the RGB colors of the M*N image blocks outputted by a chip. To improve the anti-interference, the color of the image block may be evaluated using the R/G and B/G values. In addition, in a scene where the ambient temperature is relatively stable, the temperature of the image block may be detected by infrared detection to represent the image block feature.

In S520, the image block change information of the current frame image relative to the reference frame image in the scene monitoring area is determined according to the first image block feature information and the second image block feature information at each image block location.

The image block change information includes the number of change blocks and a change trend evaluation value.

In an example solution of the embodiment, the embodiment may be combined with various example solutions in one or more of the preceding embodiments. The step where the image block change information of the current frame image relative to the reference frame image in the scene monitoring area is determined according to the first image block feature information and the second image block feature information at each image block location may include steps A1 to A2.

In step A1, an image block feature change value of the current frame image relative to the reference frame image at each image block location in the scene monitoring area is determined according to the first image block feature information and the second image block feature information at each image block location.

In step A2, if an image block feature change value at any image block location is greater than or equal to a preset image block feature change threshold, an image block at the image block location is used as a change block, and the number of change blocks of the current frame image relative to the reference frame image in the scene monitoring area is counted.

The image block feature change value is used for indicating the change of the image block definition evaluation value and the change of the image block color evaluation value.

In the embodiment, the image block feature is represented using the image block definition evaluation value and the image block color evaluation value. For example, for the image block definition evaluation value, the image block definition evaluation value of an $i^{th}$ image block in a t-frame image may be represented using $FV_i^t$. For each image block location, the image block feature change value of the current frame image relative to the reference frame image at the same image block location in the scene monitoring area may be determined according to the first image block feature information and the second image block feature information at the same image block location. In this manner, image block feature change values at different image block locations in the scene monitoring area from the reference frame image to the current frame image may be obtained.

In the embodiment, the image block feature change value may be an image block definition evaluation value change amount used for indicating the change of the image block definition evaluation value and reflects the change of an image block definition evaluation value at the same image block location before and after the transition from the reference frame image to the current frame image. The image block feature change value may also be an image block color evaluation value change amount used for indicating the change of the image block color evaluation value and reflects the change of an image block color evaluation value at the same image block location before and after the transition from the reference frame image to the current frame image. In a scene where the ambient temperature is relatively stable, the image block feature change value may also be an image block temperature change amount used for indicating the change of the image block temperature and reflects the change of an image block temperature detected by infrared detection at the same image block location before and after the transition from the reference frame image to the current frame image.

In the embodiment, the image block feature change value may be represented by one or a combination of the above-mentioned image block definition evaluation value change amount, the image block color evaluation value change amount or the image block temperature change amount. Meanwhile, a preset image block feature change threshold for distinguishing change blocks where an obvious change occurs from multiple image blocks may also be set. For example, the threshold of the image block definition evaluation value change amount is set to be $FV_{thresh}$ and the threshold of the image block color evaluation value change amount is set to be $Col_{thresh}$. In this manner, the change blocks where an obvious change occurs can be selected from image blocks at the different image block locations to obtain the number of change blocks of the current frame image relative to the reference frame image in the scene monitoring area.

In another example solution of the embodiment, the embodiment may be combined with various example solutions in one or more of the preceding embodiments. The step where the image block change information of the current frame image relative to the reference frame image in the scene monitoring area is determined according to the first image block feature information and the second image block feature information at each image block location may also include steps B1 to B2.

In step B1, the number of first change blocks of the current frame image relative to the reference frame image in the scene monitoring area and the number of second change blocks of the current frame image relative to the reference frame image in the scene monitoring area are counted according to an image block definition evaluation value indicated by the first image block feature information at each image block location and an image block definition evaluation value indicated by the second image block feature information at each image block location.

In step B2, a change trend evaluation value of the current frame image relative to the reference frame image in the scene monitoring area is calculated according to the number of the first change blocks, the number of the second change blocks and the number of image blocks in the scene monitoring area.

In the embodiment, the first change blocks include image blocks where an image definition evaluation value becomes small, and the second change blocks include image blocks where an image definition evaluation value becomes large. For each image block location, an image block definition evaluation value between an image block definition evaluation value indicated by the first image block feature information and an image block definition evaluation value indicated by the second image block feature information at the same image block location may be determined, and whether the image block definition evaluation value at the same image block location becomes large or small is determined through the image block definition evaluation values. Further, the image blocks where an image definition evaluation value becomes small and the image blocks where an image definition evaluation value becomes large at each image block location may be counted, that is, the number of the first change blocks and the number of the second change blocks may be determined.

In the embodiment, after the number of the first change blocks, the number of the second change blocks and the number of the image blocks in the scene monitoring area are determined, the change trend evaluation value may be calculated using the following formula:

$$Q = \alpha * \frac{|\sum_{i=0}^{i \leq E} Num_{down,i} - \sum_{i=0}^{i \leq E} Num_{up,i}|}{\sum_{i=0}^{i \leq E} Num_{down,i} + \sum_{i=0}^{i \leq E} Num_{up,i}}.$$

In the formula, α represents an adjustment operator; E represents the number of the image blocks in the scene monitoring area; $\text{Num}_{down,i}$ represents the number of image blocks where the image block definition obviously changes and becomes small in the scene monitoring area, that is, the number of the first change blocks; $\text{Num}_{up,i}$ represents the number of image blocks where the image block definition obviously changes and becomes large in the scene monitoring area, that is, the number of second change blocks; and Q represents the change trend evaluation value of the current frame image relative to the reference frame image in the scene monitoring area.

In the embodiment, when the object moves into the picture of the scene monitoring area, the image block definition evaluation value calculated by the chip changes due to the effect caused by the change of the overall image. For example, the exposure of the device is automatically adjusted based on the change of the brightness information of the overall image. Briefly, the larger the image brightness is, the larger the definition evaluation value is. In this manner, the determination of the image block definition evaluation value change trend at each image block location is affected. Therefore, an image definition evaluation value offset of the current frame image caused by the change of the picture of the scene monitoring area may be determined according to the image block color evaluation value indicated by the first image block feature information and the image block color evaluation value indicated by the second image block feature information at each image block location, and the image block definition evaluation value of the current frame image at each image block location in the scene monitoring area is corrected according to the image definition evaluation value offset of the current frame image to obtain the real image block definition evaluation value at each image block location after the picture changes.

For example, the stable block area SA and the change block area CA of the current frame image t and the reference frame image in the scene monitoring area are extracted based on the color information evaluation value, where S represents the number of image blocks in the stable block area, and C represents the number of image blocks in the change block area. It is to be noted that the color information evaluation value is not a unique feasible statistical value for determining the image stable block. The image definition evaluation value offset $\Delta FV^t$ of the current frame image t caused by the image change may be extracted, and after the offset $\Delta FV^t$ is removed from the image block definition evaluation value $FV_{i,real}^t$ of the $i^{th}$ image block of the current frame image t, the change trend $\text{Trend}_i$ of the image definition evaluation value $FV_{i,real}^t$ of the $i^{th}$ image block after the image change may be really reflected. The image definition evaluation value offset $\Delta FV^t$ of the current frame image t caused by the image change may be calculated by using the following formula:

$$\Delta FV^t = \sum_{i=0}^{i \le S} FV_i^t/S, \ (S \le M*N),$$

where $FV_i^t$ represents the definition evaluation value of the stable block SA in the t-frame image.

In S530, whether to trigger focusing on the scene monitoring area is determined according to the image block change information in the scene monitoring area.

In S540, if it is determined to trigger focusing on the scene monitoring area, a focusing area of interest triggered by the movement of an object relative to the scene monitoring area is determined, and a focusing operation is performed on the focusing area of interest.

According to the auto-focusing method in the embodiment of the present application, the scene change monitoring of the picture is performed in real time in the scene monitoring area to accurately obtain the image block change information of the current frame image relative to the reference frame image in the scene monitoring area so that the focusing operation can be triggered accurately when the object moves out of the photographing picture or moves in the photographing picture based on the number of change blocks and the change trend evaluation value in the image block change information; the focusing operation is performed on the focusing area of interest triggered by the movement of the object relative to the scene monitoring area so that the problem that the auto-focusing cannot concentrate on the requirement to trigger the focusing of the object on a complex background can be solved, thereby stably, efficiently and clearly focusing the object.

Figure 6:
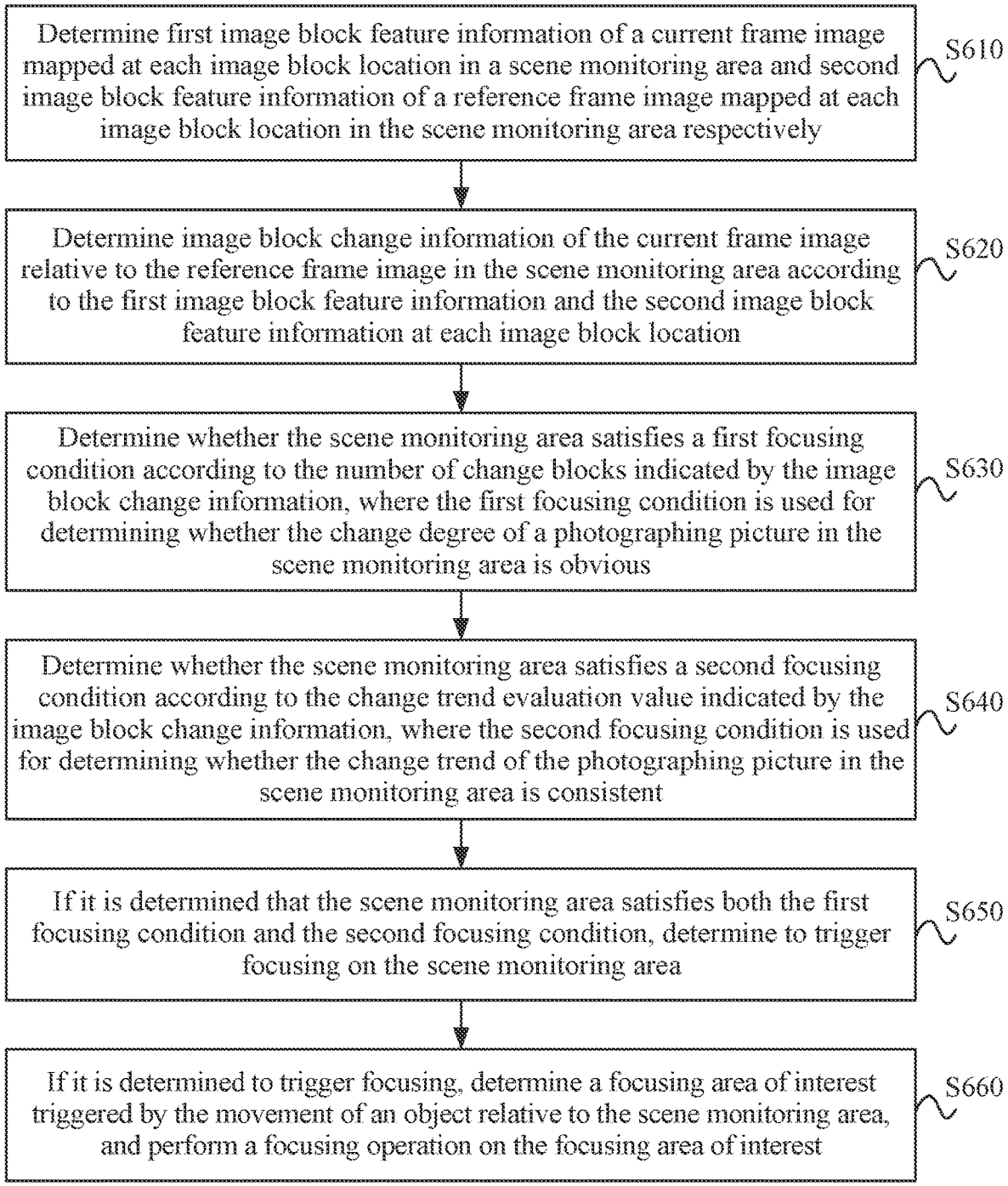
FIG. 6 is a flowchart of another auto-focusing method according to an embodiment of the present application.

FIG. 6 is a flowchart of another auto-focusing method according to an embodiment of the present application. The embodiment of the present application is optimized based on the preceding embodiments, and the embodiment of the present application may be combined with various example solutions in one or more of the preceding embodiments. As shown in FIG. 6, the auto-focusing method provided in the embodiment of the present application may include steps S610, S620, S630, S640, S650 and S660.

In S610, first image block feature information of a current frame image mapped at each image block location in a scene monitoring area and second image block feature information of a reference frame image mapped at each image block location in the scene monitoring area are determined respectively, where the scene monitoring area includes an image effective area pre-divided in a photographing picture.

In S620, the image block change information of the current frame image relative to the reference frame image in the scene monitoring area is determined according to the first image block feature information and the second image block feature information at each image block location, where the image block feature information each includes an image block definition evaluation value and an image block color evaluation value, and the image block change information includes the number of change blocks and a change trend evaluation value.

In S630, whether the scene monitoring area satisfies a first focusing condition is determined according to the number of change blocks indicated by the image block change information, where the first focusing condition is used for determining whether the change degree of a photographing picture in the scene monitoring area is obvious.

In the embodiment, the first focusing condition is that the number of change blocks of the current frame image relative to the reference frame image in the scene monitoring area is greater than a change block number threshold $\text{Num}_{fir}$, where the scene monitoring area is a dynamic area, and the scene monitoring area may be an image effective area B by default. The first focusing condition aims to determine whether the photographing picture in the scene monitoring area has obviously changed to extract the location of the area where the change occurs. The change block number threshold $\text{Num}_{fir}$ set in the first focusing condition changes based on the dynamic change of the scene monitoring area, but the default change block number threshold is restored after each focusing is completed. If the number of change blocks in the scene monitoring area satisfies the first focusing condition, whether a second focusing condition is satisfied starts to be determined. If the number of the change blocks in the scene monitoring area does not satisfy the first focusing condition, the current detection ends, and the process return to determine whether the first focusing condition is satisfied.

In S640, whether the scene monitoring area satisfies the second focusing condition is determined according to the change trend evaluation value indicated by the image block change information, where the second focusing condition is used for determining whether the change trend of the photographing picture in the scene monitoring area is consistent.

In the embodiment, the second focusing condition is that the change trend evaluation value of the current frame image relative to the reference frame image in the scene monitoring area is greater than a preset change trend evaluation value threshold $Q_{sen}$. The second focusing condition is expressed as whether the change trend of the photographing picture of the current frame image and the change trend of the photographing picture of the reference frame image in the scene monitoring area are consistent as a whole. The determination of the overall consistency of the change trend may be based on the extracted change trend evaluation value of the image block definition valuation value of the current frame image relative to the reference frame image in the scene monitoring area. For example, when the change trend evaluation value Q indicated by the image block change information is less than the preset change trend evaluation value threshold set in the second focusing condition, it is considered that a certain number of blocks where the definition evaluation value becomes large (the details of the image blocks increase) and a certain number of blocks where the definition evaluation value becomes small (the details of the image blocks decrease) simultaneously exist in the image effective area. At this point, the change trend of the overall image is inconsistent, and the focusing does not need to be performed. When the change trend evaluation value Q indicated by the image block change information is greater than the preset change trend evaluation value threshold $Q_{sen}$ set in the second focusing condition, it is considered that the definition evaluation values of most of image blocks in the image effective area become large or become small. At this point, it can be considered that the change trend of the current image information is consistent as a whole, and the focusing is triggered.

In S650, if it is determined that the scene monitoring area satisfies both the first focusing condition and the second focusing condition, the focusing on the scene monitoring area is determined to be triggered.

In the embodiment, the second focusing condition mainly achieves the recognition of the motion pattern of a moving object in the image to determine whether to trigger the focusing operation on the scene monitoring area. Based on the determination result that the focusing operation on the scene monitoring area is triggered, a corresponding dynamic focusing weight is issued to determine the focusing area of interest triggered by the movement of the object relative to the scene monitoring area. Based on the determination result that the focusing operation on the scene monitoring area is not triggered, whether to recalculate and update the scene monitoring area is determined.

In S660, if it is determined to trigger the focusing, a focusing area of interest triggered by the movement of an object relative to the scene monitoring area is determined, and a focusing operation is performed on the focusing area of interest.

In the embodiment, with reference to FIG. 4, in the case a where the object moves into the photographing picture of the scene monitoring area and the case b where the object moves out of the photographing picture of the scene monitoring area, if the number of change blocks of the current frame image relative to the reference frame image in the scene monitoring area where the color information and the image definition obviously change satisfies the first focusing condition and the change trend of the photographing picture of the scene monitoring area satisfies the second focusing condition, the image block color evaluation value change amount $ColChange_i$, at each image block location in the scene monitoring area may be calculated. The dynamic focusing weight $Weight_i$ is calculated based on the correspondence between the change blocks caused by the obvious change in the image color and M*N blocks divided by the chip in the photographing picture, where an area with a non-zero weight is the focusing area of interest, and the calculation formula is $$\begin{cases} \text{Weight} = 1, (|ColChange_i| > Col_{thresh}) \\ \text{Weight}_i = 0, (\text{else}) \end{cases}.$$

In the embodiment, with reference to FIG. 4, the definition evaluation value $FV_{output}$ in the focusing algorithm is derived from the calculated dynamic focusing weight $Weight_i$, that is, $$FV_{output} = \sum_{i=0}^{i \leq M*N} (FV_i * \text{Weight}_i),$$

where $FV_i$ represents the image block definition evaluation value of the $i^{th}$ image block. Further, the interference of the non-focusing area of interest is eliminated using the hill climbing-based focusing algorithm according to the definition evaluation value $FV_{output}$ in the focusing algorithm, that is, for the case a, the location of the focusing motor where the clear point of the object moving into the image is located can be found more quickly, effectively and steadily in the optimal definition evaluation value search, and for the case b, the clear point can be effectively focused on the background after the object moves out. The reference frame for scene detection is updated after the focusing is completed. After the scene change triggers the termination of auto-focusing, the current frame image is used as a reference frame image, the scene monitoring area and the change block number threshold in the first focusing condition are re-assigned a default parameter $Num_{fir}$, and then the next scene detection starts.

According to the auto-focusing method in the embodiment of the present application, the scene change monitoring of the picture is performed in real time in the scene monitoring area to accurately obtain the image block change information of the current frame image relative to the reference frame image in the scene monitoring area so that the focusing operation can be triggered accurately when the object moves out of the photographing picture or moves in the photographing picture based on the number of change blocks and the change trend evaluation value in the image block change information; the focusing operation is performed on the focusing area of interest triggered by the movement of the object relative to the scene monitoring area so that the problem that the auto-focusing cannot concentrate on the requirement to trigger the focusing of the object on a complex background can be solved, thereby stably, efficiently and clearly focusing the object. For example, the probability in which the object of the videoconferencing device at a telephoto end is successfully focused after the object moves into the picture can be improved, and the picture stability when the object of the videoconferencing device at a telephoto end moves in the picture can be improved.

On the basis of the preceding embodiments, the auto-focusing method provided in the embodiment of the present application may also include steps C1 to C2.

In step C1, if it is determined that the scene monitoring area satisfies the first focusing condition and does not satisfy the second focusing condition, the focusing operation is not triggered on the scene monitoring area; a location area where the object is located after the object moves in the scene monitoring area is determined, and the location area where the object is located after the object moves in the scene monitoring area is used as a new scene monitoring area.

In step C2, whether to update the first focusing condition and the reference frame image for a next focusing monitoring phase is determined according to an intersection result of the new scene monitoring area and a pre-divided image core area in the photographing picture.

In the embodiment, in the case where it is determined that the scene monitoring area satisfies the first focusing condition and does not satisfy the second focusing condition, whether to change the first focusing condition is evaluated. At this point, the new scene monitoring area DetScene may be recalculated based on the image block definition evaluation value change amount and the image block color evaluation value change amount of the current frame image relative to the reference frame image in the scene monitoring area using the formula:

$$\begin{cases} \text{Scene}_i = 1, (|\text{ColChange}_i| > \text{Col}_{thresh} \text{ \& Thresh}_i > FV_{thresh}) \\ \text{Scene}_i = 0, (\text{else}) \end{cases}, (i \leq M*N).$$

In the formula, $\text{ColChange}_i$ represents the image block color evaluation value change amount of the $i^{th}$ image block in the original scene monitoring area, $\text{Col}_{thresh}$ represents the threshold for determining the image block color change, $\text{Thresh}_i$ represents the image block definition evaluation value change amount of the $i^{th}$ image block in the original scene monitoring area, $FV_{thresh}$ represents the threshold for determining the image block definition change, and the new scene monitoring area DetScene is the area where $\text{Scene}_i$ is non-zero.

In the embodiment, with reference to FIG. 4, if the new scene monitoring area and the image core area have an intersection, the original scene monitoring area and the determination threshold of the first focusing condition do not need to be updated, the default image effective area B is still used as the scene monitoring area in the next focusing, and the default change block number threshold $\text{Num}_{fir}$ is still used as the determination threshold of the first focusing condition. If the scene monitoring area and the image core area have no intersection, the scene monitoring area DetScene is updated to a non-zero area in $$\begin{cases} \text{Scene}_i = 1, (|\text{ColChange}_i| > \text{Col}_{thresh} \text{ \& Thresh}_i > FV_{thresh}) \\ \text{Scene}_i = 0, (\text{else}) \end{cases}, (i \leq M*N)$$

and the change block number threshold Num fir of the first focusing condition is changed into $$\left(\left\lfloor \frac{p}{10} \right\rfloor + 1\right),$$

where p represents the number of image blocks whose value is 1 in the scene monitoring area.

In the embodiment, with reference to FIG. 4, in a case where the first focusing condition is satisfied but the second focusing condition is not satisfied, the scene is subdivided into a case c and a case d according to whether the new scene monitoring area and the image core area has the intersection. If the scene monitoring area and the image core area have an intersection, the scene is divided into the case c, and if the scene monitoring area and the image core area have no intersection, the scene is divided into the case d. In the case c, the object is still located in the image core area with the highest degree of attention in the default scene monitoring area after moving, and the default scene monitoring area is the image effective area; when the object continues to move out of the picture, as shown in the case b, the number of image change blocks in the default monitoring scene area easily satisfies the default threshold $\text{Num}_{fir}$ of the first focusing condition, and then the focusing is triggered to make the background clear. In the case d, the object moves to the image effective area but is not located in the core area, and at this point, the focusing does not need to be triggered but the reference frame is updated.

In the embodiment, with reference to FIG. 4, when the object directly leaves the picture, if the scene monitoring area is still the image effective area at this point, the number of change blocks after the object is moved out does not easily satisfy the default threshold of the first focusing condition. At this point, the scene monitoring area and the related thresholds in the first focusing condition need to be updated in the case d to prevent the object in the case d from continuing to move out while not satisfying the first focusing condition and thus prevent the image from blurring of the image after the object is moved out of the picture. Therefore, when the first focusing condition is satisfied but the second focusing condition is not satisfied, the focusing does not need to be performed, and the current detection ends. The reference frame, the scene monitoring area and the determination threshold of the first focusing condition are updated for the next detection.

Figure 7:
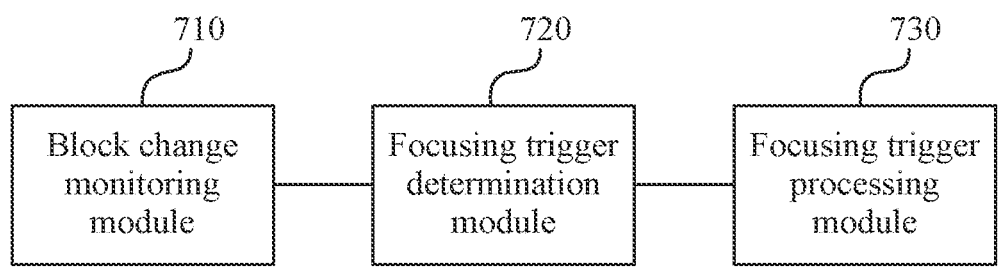
FIG. 7 is a block diagram of an auto-focusing apparatus according to an embodiment of the present application.

FIG. 7 is a block diagram of an auto-focusing apparatus according to an embodiment of the present application. The embodiment of the present application may be applicable to a case of performing auto-focusing on a focusing area of interest with an indefinite size in the focusing process when the depth of field of a device at a telephoto end is small. The apparatus may be implemented by software and/or hardware and is integrated into any electronic device having a network communication function. As shown in FIG. 7, the auto-focusing apparatus provided in the embodiment may include a block change monitoring module 710, a focusing trigger determination module 720, and a focusing trigger processing module 730.

The block change monitoring module 710 is configured to determine image block change information of a current frame image relative to a reference frame image in a scene monitoring area, where the scene monitoring area includes a pre-divided image effective area in a photographing picture.

The focusing trigger determination module 720 is configured to determine, according to the image block change information in the scene monitoring area, whether to trigger focusing on the scene monitoring area.

The focusing trigger processing module 730 is configured to, if it is determined to trigger the focusing, determine a focusing area of interest triggered by the movement of an object relative to the scene monitoring area, and perform a focusing operation on the focusing area of interest.

On the basis of the preceding embodiments, the operation that the image block change information of the current frame image relative to the reference frame image in the scene monitoring area is determined includes the following operations.

First image block feature information of the current frame image mapped at each image block location in the scene monitoring area and second image block feature information of the reference frame image mapped at each image block location in the scene monitoring area are determined respectively.

The image block change information of the current frame image relative to the reference frame image in the scene monitoring area is determined according to the first image block feature information and the second image block feature information at each image block location.

The image block feature information each includes an image block definition evaluation value and an image block color evaluation value, and the image block change information includes the number of change blocks and a change trend evaluation value.

On the basis of the preceding embodiments, the operation that the image block change information of the current frame image relative to the reference frame image in the scene monitoring area is determined according to the first image block feature information and the second image block feature information at each image block location includes the following operations.

An image block feature change value of the current frame image relative to the reference frame image at each image block location in the scene monitoring area is determined according to the first image block feature information and the second image block feature information at each image block location.

If an image block feature change value at any image block location is greater than or equal to a preset image block feature change threshold, an image block at the image block location is used as a change block, and the number of change blocks of the current frame image relative to the reference frame image in the scene monitoring area is counted.

The image block feature change value is used for indicating the change of the image block definition evaluation value and the change of the image block color evaluation value.

On the basis of the preceding embodiments, the operation that the image block change information of the current frame image relative to the reference frame image in the scene monitoring area is determined according to the first image block feature information and the second image block feature information at each image block location includes the following operations.

The number of first change blocks of the current frame image relative to the reference frame image in the scene monitoring area and the number of second change blocks of the current frame image relative to the reference frame image in the scene monitoring area are counted according to the image block definition evaluation value indicated by the first image block feature information at each image block location and the image block definition evaluation value indicated by the second image block feature information at each image block location, where the first change blocks include image blocks where an image definition evaluation value becomes small, and the second change blocks include image blocks where an image definition evaluation value becomes large.

The change trend evaluation value of the current frame image relative to the reference frame image in the scene monitoring area is calculated according to the number of the first change blocks, the number of the second change blocks and the number of image blocks in the scene monitoring area.

On the basis of the preceding embodiments, the operation that whether to trigger focusing on the scene monitoring area is determined according to the image block change information in the scene monitoring area includes the following operations.

Whether the scene monitoring area satisfies a first focusing condition is determined according to the number of change blocks indicated by the image block change information, where the first focusing condition is used for determining whether the change degree of a photographing picture in the scene monitoring area is obvious.

Whether the scene monitoring area satisfies a second focusing condition is determined according to the change trend evaluation value indicated by the image block change information, where the second focusing condition is used for determining whether the change trend of the photographing picture in the scene monitoring area is consistent.

If it is determined that the scene monitoring area satisfies both the first focusing condition and the second focusing condition, the focusing on the scene monitoring area is determined to be triggered.

On the basis of the preceding embodiments, the operation that the focusing area of interest triggered by the movement of the object relative to the scene monitoring area is determined includes the following operations.

An image block color evaluation value change amount of the current frame image relative to the reference frame image at each image block location in the scene monitoring area is calculated according to the image block color evaluation value indicated by the first image block feature information at each image block location and the image block color evaluation value indicated by the second image block feature information at each image block location.

A location area where an absolute value of an image block color evaluation value change amount is greater than a preset color evaluation value change amount threshold in the scene monitoring area is used as the focusing area of interest triggered by the object.

The focusing area of interest includes a location area where the object is located after the object moves into the scene monitoring area or a location area where the object is located before the object moves out of the scene monitoring area.

On the basis of the preceding embodiments, the method further includes the operations.

If it is determined that the scene monitoring area satisfies the first focusing condition and does not satisfy the second focusing condition, the focusing on the scene monitoring area is not triggered; a location area where the object is located after the object moves in the scene monitoring area is determined, and the location area where the object is located after the object moves in the scene monitoring area is used as a new scene monitoring area.

Whether to update the first focusing condition and the reference frame image for a next focusing monitoring phase is determined according to an intersection result of the new scene monitoring area and a pre-divided image core area in the photographing picture.

The auto-focusing apparatus provided in the embodiment of the present application may perform the auto-focusing method provided in any one of the preceding embodiments of the present application and has functions and effects corresponding to the auto-focusing method performed. For the detailed process, reference may be made to related operations in the auto-focusing method in the preceding embodiments.

Figure 8:
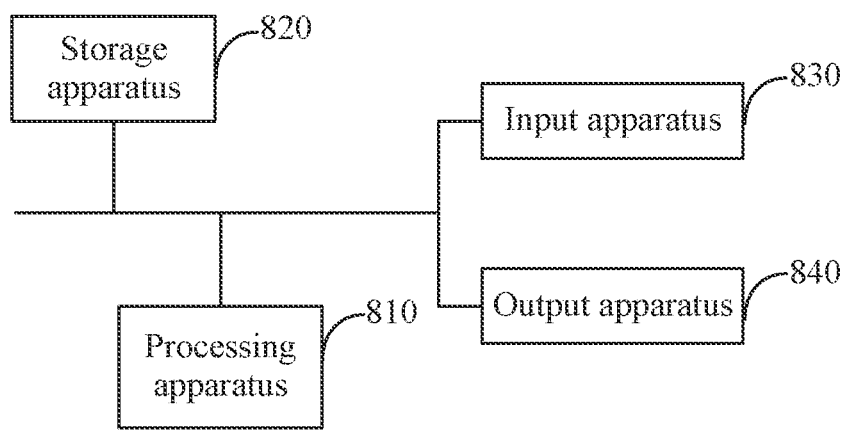
FIG. 8 is a structure diagram of an electronic device according to an embodiment of the present application.

FIG. 8 is a structure diagram of an electronic device according to an embodiment of the present application. As shown in FIG. 8, the electronic device provided in the embodiment of the present application includes one or more processors 810 and a storage apparatus 820. One or more processors 810 may be disposed in the electronic device, and one processor 810 is illustrated in FIG. 8 as an example. The storage apparatus 820 is configured to store one or more programs, where the one or more programs are executed by the one or more processors 810 to enable the one or more processors 810 to implement the auto-focusing method described in any one of the embodiments of the present application.

The electronic device may further include an input apparatus 830 and an output apparatus 840.

The processor 810, the storage apparatus 820, the input apparatus 830 and the output apparatus 840 in the electronic device may be connected via a bus or in other manners, and the connection via a bus is illustrated in FIG. 8 as an example.

As a computer-readable storage medium, the storage apparatus 620 in the electronic device may be configured to store one or more programs. The programs may be software programs, computer-executable programs and modules, such as program instructions/modules corresponding to the auto-focusing method provided in the embodiments of the present application. The processor 810 executes software programs, instructions and modules stored in the storage apparatus 820 to perform various function applications and data processing of the electronic device, that is, to implement the auto-focusing method in the preceding method embodiments.

The storage apparatus 820 may include a program storage area and a data storage area. The program storage area may store an operating system and an application program required by at least one function. The data storage area may store data created depending on the use of the electronic device. In addition, the storage apparatus 820 may include a high-speed random-access memory and may also include a non-volatile memory, such as at least one disk memory, a flash memory or another non-volatile solid-state memory. In some examples, the storage apparatus 820 may include memories which are remotely disposed relative to the processor 810, and these remote memories may be connected to the device via a network. Examples of the preceding network include, but are not limited to, the Internet, an intranet, a local area network, a mobile communication network, and combinations thereof.

The input apparatus 830 may be configured to receive the input digital or character information and generate key signal input related to user settings and function control of the electronic device. The output apparatus 840 may include a display screen and other display devices.

When executed by the one or more processors 810, the one or more programs included in the above electronic device perform the following operations.

Image block change information of a current frame image relative to a reference frame image in a scene monitoring area is determined, where the scene monitoring area includes a pre-divided image effective area in a photographing picture.

Whether to trigger focusing on the scene monitoring area is determined according to the image block change information in the scene monitoring area.

In response to determining to trigger the focusing, a focusing area of interest triggered by the movement of an object relative to the scene monitoring area is determined, and a focusing operation is performed on the focusing area of interest.

Of course, it is to be understood by those skilled in the art that when executed by the one or more processors 810, the one or more programs included in the above electronic device may also perform related operations in the auto-focusing method provided in any one of the embodiments of the present application.

The embodiments of the present application provide a computer-readable storage medium. The computer-readable storage medium is configured to store a computer program, where the program, when executed by a processor, is used for performing an auto-focusing method. The method includes the following steps.

Image block change information of a current frame image relative to a reference frame image in a scene monitoring area is determined, where the scene monitoring area includes a pre-divided image effective area in a photographing picture.

Whether to trigger focusing on the scene monitoring area is determined according to the image block change information in the scene monitoring area.

In response to determining to trigger the focusing, a focusing area of interest triggered by the movement of an object relative to the scene monitoring area is determined, and a focusing operation is performed on the focusing area of interest.

The program, when executed by the processor, may also be used for performing the auto-focusing method provided in any one of the embodiments of the present application.

The computer storage medium in the embodiment of the present application may adopt any combination of one or more computer-readable media. The computer-readable medium may be a computer-readable signal medium or a computer-readable storage medium. The computer-readable storage medium may be, but is not limited to, an electronic, magnetic, optical, electromagnetic, infrared or semiconductor system, apparatus or device, or any combination thereof. Specific examples of the computer-readable storage medium may include (non-exhaustive list): an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof. The computer-readable storage medium may be any tangible medium including or storing a program that can contain, or store a program for use by or in connection with an instruction execution system, apparatus, or device.

The computer-readable signal medium may include a propagated data signal with computer-readable program codes embodied therein, for example, in a baseband or as part of a carrier wave. Such a propagated data signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus, or device. Media that store computer-executable instructions are non-transitory computer-readable storage media.

The program codes included on the computer-readable medium may be transmitted via any suitable medium that includes, but is not limited to, a wire, an optical cable, a radio frequency (RF), or any suitable combination thereof.

Computer program codes for performing the operations in the present application may be written in one or more programming languages or combinations thereof. The programming languages include object-oriented programming languages such as Java, Smalltalk and C++, and further include conventional procedural programming languages such as C or similar programming languages. The program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any kind of network including a local area network (LAN) or a wide area network (WAN), or may be connected to an external computer (for example, via the Internet through an Internet service provider).

In the description of the specification, the description of reference terms "an embodiment", "some embodiments", "example", "specific example", or "some examples" and the like means a particular feature, structure, material, or characteristic described in connection with the embodiment or example is included in at least one embodiment or example of the present application. In the specification, the illustrative description of the preceding terms does not necessarily refer to the same embodiment or example. Moreover, the particular features, structures, materials or characteristics may be combined in a suitable manner in any one or more embodiments or examples.

What is claimed is:

1. An auto-focusing method, comprising:
   determining image block change information of a current frame image relative to a reference frame image in a scene monitoring area, wherein the scene monitoring area comprises a pre-divided image effective area in a photographing picture;
   determining, according to the image block change information, whether to trigger a focusing operation on the scene monitoring area; and
   in response to determining to trigger the focusing operation, determining a focusing area of interest triggered by movement of an object relative to the scene monitoring area, and performing the focusing operation on the focusing area of interest;
   wherein the scene monitoring area comprises at least one image block, and determining the image block change information of the current frame image relative to the reference frame image in the scene monitoring area comprises:
   determining first image block feature information of the current frame image mapped at each image block location in the scene monitoring area and second image block feature information of the reference frame image mapped at each image block location in the scene monitoring area, respectively; and
   determining, according to the first image block feature information and the second image block feature information at each image block location, the image block change information of the current frame image relative to the reference frame image in the scene monitoring area; and
   wherein the first image block feature information and the second image block feature information each comprise an image block definition evaluation value and an image block color evaluation value, respectively, and the image block change information comprises a number of change blocks and a change trend evaluation value.

2. The method of claim 1, wherein determining, according to the first image block feature information and the second image block feature information at each image block location, the image block change information of the current frame image relative to the reference frame image in the scene monitoring area comprises:
   determining, according to the first image block feature information and the second image block feature information at each image block location, an image block feature change value of the current frame image relative to the reference frame image at each image block location in the scene monitoring area; and
   in response to determining that an image block feature change value at any image block location is greater than or equal to a preset image block feature change threshold, using an image block at the any image block location as a change block, and counting a number of change blocks of the current frame image relative to the reference frame image in the scene monitoring area;
   wherein the image block feature change value is used for indicating a change of the image block definition evaluation value and a change of the image block color evaluation value.

3. The method of claim 1, wherein determining, according to the first image block feature information and the second image block feature information at each image block location, the image block change information of the current frame image relative to the reference frame image in the scene monitoring area comprises:
   counting, according to the image block definition evaluation value indicated by the first image block feature information at each image block location and the image block definition evaluation value indicated by the second image block feature information at each image block location, a number of first change blocks of the current frame image relative to the reference frame image in the scene monitoring area and a number of second change blocks of the current frame image relative to the reference frame image in the scene monitoring area, wherein the first change blocks comprise an image block where an image definition evaluation value becomes small, and the second change blocks comprise an image block where an image definition evaluation value becomes large; and
   calculating, according to the number of the first change blocks, the number of the second change blocks and a number of image blocks in the scene monitoring area, the change trend evaluation value of the current frame image relative to the reference frame image in the scene monitoring area.

4. The method of claim 3, wherein the image block definition evaluation value comprises pieces of high-frequency information of the image blocks, wherein a piece of high-frequency information of each image block of the image blocks represents a degree of detail richness of the each image block such that a definition of the each image block is evaluated using the high-frequency information of the each image block.

5. The method of claim 1, wherein determining, according to the image block change information, whether to trigger the focusing operation on the scene monitoring area comprises:
- determining, according to the number of the change blocks indicated by the image block change information, whether the scene monitoring area satisfies a first focusing condition, wherein the first focusing condition is used for determining whether a change degree of a photographing picture in the scene monitoring area is obvious;
- determining, according to the change trend evaluation value indicated by the image block change information, whether the scene monitoring area satisfies a second focusing condition, wherein the second focusing condition is used for determining whether a change trend of the photographing picture in the scene monitoring area is consistent; and
- determining, based on a determination result that the scene monitoring area satisfies both the first focusing condition and the second focusing condition, to trigger the focusing operation on the scene monitoring area.

6. The method of claim 5, further comprising:
- not triggering, based on a determination result that the scene monitoring area satisfies the first focusing condition and does not satisfy the second focusing condition, the focusing operation on the scene monitoring area; and determining a location area where the object is located after the object moves in the scene monitoring area, and using the location area where the object is located after the object moves in the scene monitoring area as a new scene monitoring area; and
- determining, according to an intersection result of the new scene monitoring area and a pre-divided image core area in the photographing picture, whether to update the first focusing condition and the reference frame image for a next focusing monitoring phase.

7. The method of claim 1, wherein determining the focusing area of interest triggered by the movement of the object relative to the scene monitoring area comprises:
- calculating, according to the image block color evaluation value indicated by the first image block feature information at each image block location and the image block color evaluation value indicated by the second image block feature information at each image block location, an image block color evaluation value change amount of the current frame image relative to the reference frame image at each image block location in the scene monitoring area; and
- using a location area where an absolute value of an image block color evaluation value change amount is greater than a preset color evaluation value change amount threshold in the scene monitoring area as the focusing area of interest triggered by the object;
- wherein the focusing area of interest comprises a location area where the object is located after the object moves into the scene monitoring area or a location area where the object is located before the object moves out of the scene monitoring area.

8. An electronic device, comprising:
- at least one processing apparatus; and
- a storage apparatus configured to store at least one program;
- wherein the at least one program, when executed by the at least one processing apparatus, enables the at least one processing apparatus to implement:
  - determining image block change information of a current frame image relative to a reference frame image in a scene monitoring area, wherein the scene monitoring area comprises a pre-divided image effective area in a photographing picture;
  - determining, according to the image block change information, whether to trigger a focusing operation on the scene monitoring area; and
  - in response to determining to trigger the focusing operation, determining a focusing area of interest triggered by movement of an object relative to the scene monitoring area, and performing the focusing operation on the focusing area of interest;
- wherein the scene monitoring area comprises at least one image block, and determining the image block change information of the current frame image relative to the reference frame image in the scene monitoring area comprises:
  - determining first image block feature information of the current frame image mapped at each image block location in the scene monitoring area and second image block feature information of the reference frame image mapped at each image block location in the scene monitoring area, respectively; and
  - determining, according to the first image block feature information and the second image block feature information at each image block location, the image block change information of the current frame image relative to the reference frame image in the scene monitoring area; and
- wherein the first image block feature information and the second image block feature information each comprise an image block definition evaluation value and an image block color evaluation value, respectively, and the image block change information comprises a number of change blocks and a change trend evaluation value.

9. The electronic device of claim 8, wherein determining, according to the first image block feature information and the second image block feature information at each image block location, the image block change information of the current frame image relative to the reference frame image in the scene monitoring area comprises:
- determining, according to the first image block feature information and the second image block feature information at each image block location, an image block feature change value of the current frame image relative to the reference frame image at each image block location in the scene monitoring area; and
- in response to determining that an image block feature change value at any image block location is greater than or equal to a preset image block feature change threshold, using an image block at the any image block location as a change block, and counting a number of change blocks of the current frame image relative to the reference frame image in the scene monitoring area;
- wherein the image block feature change value is used for indicating a change of the image block definition evaluation value and a change of the image block color evaluation value.

10. The electronic device of claim 8, wherein determining, according to the first image block feature information and the second image block feature information at each image block location, the image block change information of the current frame image relative to the reference frame image in the scene monitoring area comprises:
  counting, according to the image block definition evaluation value indicated by the first image block feature information at each image block location and the image block definition evaluation value indicated by the second image block feature information at each image block location, a number of first change blocks of the current frame image relative to the reference frame image in the scene monitoring area and a number of second change blocks of the current frame image relative to the reference frame image in the scene monitoring area, wherein the first change blocks comprise an image block where an image definition evaluation value becomes small, and the second change blocks comprise an image block where an image definition evaluation value becomes large; and
  calculating, according to the number of the first change blocks, the number of the second change blocks and a number of image blocks in the scene monitoring area, the change trend evaluation value of the current frame image relative to the reference frame image in the scene monitoring area.

11. The electronic device of claim 8, wherein determining, according to the image block change information, whether to trigger the focusing operation on the scene monitoring area comprises:
  determining, according to the number of the change blocks indicated by the image block change information, whether the scene monitoring area satisfies a first focusing condition, wherein the first focusing condition is used for determining whether a change degree of a photographing picture in the scene monitoring area is obvious;
  determining, according to the change trend evaluation value indicated by the image block change information, whether the scene monitoring area satisfies a second focusing condition, wherein the second focusing condition is used for determining whether a change trend of the photographing picture in the scene monitoring area is consistent; and
  determining, based on a determination result that the scene monitoring area satisfies both the first focusing condition and the second focusing condition, to trigger the focusing operation on the scene monitoring area.

12. The electronic device of claim 11, wherein the at least one program, when executed by the at least one processing apparatus, enables the at least one processing apparatus to further implement:
  not triggering, based on a determination result that the scene monitoring area satisfies the first focusing condition and does not satisfy the second focusing condition, the focusing operation on the scene monitoring area; and determining a location area where the object is located after the object moves in the scene monitoring area, and using the location area where the object is located after the object moves in the scene monitoring area as a new scene monitoring area; and
  determining, according to an intersection result of the new scene monitoring area and a pre-divided image core area in the photographing picture, whether to update the first focusing condition and the reference frame image for a next focusing monitoring phase.

13. The electronic device of claim 8, wherein determining the focusing area of interest triggered by the movement of the object relative to the scene monitoring area comprises:
  calculating, according to the image block color evaluation value indicated by the first image block feature information at each image block location and the image block color evaluation value indicated by the second image block feature information at each image block location, an image block color evaluation value change amount of the current frame image relative to the reference frame image at each image block location in the scene monitoring area; and
  using a location area where an absolute value of an image block color evaluation value change amount is greater than a preset color evaluation value change amount threshold in the scene monitoring area as the focusing area of interest triggered by the object;
  wherein the focusing area of interest comprises a location area where the object is located after the object moves into the scene monitoring area or a location area where the object is located before the object moves out of the scene monitoring area.

14. A non-transitory computer-readable storage medium storing a computer program, wherein the computer program, when executed by a processing apparatus, is configured to implement:
  determining image block change information of a current frame image relative to a reference frame image in a scene monitoring area, wherein the scene monitoring area comprises a pre-divided image effective area in a photographing picture;
  determining, according to the image block change information, whether to trigger a focusing operation on the scene monitoring area; and
  in response to determining to trigger the focusing operation, determining a focusing area of interest triggered by movement of an object relative to the scene monitoring area, and performing the focusing operation on the focusing area of interest;
  wherein the scene monitoring area comprises at least one image block, and determining the image block change information of the current frame image relative to the reference frame image in the scene monitoring area comprises:
    determining first image block feature information of the current frame image mapped at each image block location in the scene monitoring area and second image block feature information of the reference frame image mapped at each image block location in the scene monitoring area, respectively; and
    determining, according to the first image block feature information and the second image block feature information at each image block location, the image block change information of the current frame image relative to the reference frame image in the scene monitoring area; and
  wherein the first image block feature information and the second image block feature information each comprise an image block definition evaluation value and an image block color evaluation value, respectively, and the image block change information comprises a number of change blocks and a change trend evaluation value.

15. The non-transitory computer-readable storage medium of claim 14, wherein determining, according to the first image block feature information and the second image block feature information at each image block location, the image block change information of the current frame image relative to the reference frame image in the scene monitoring area comprises:

determining, according to the first image block feature information and the second image block feature information at each image block location, an image block feature change value of the current frame image relative to the reference frame image at each image block location in the scene monitoring area; and in response to determining that an image block feature change value at any image block location is greater than or equal to a preset image block feature change threshold, using an image block at the any image block location as a change block, and counting a number of change blocks of the current frame image relative to the reference frame image in the scene monitoring area;

wherein the image block feature change value is used for indicating a change of the image block definition evaluation value and a change of the image block color evaluation value.

16. The non-transitory computer-readable storage medium of claim 14, wherein determining, according to the first image block feature information and the second image block feature information at each image block location, the image block change information of the current frame image relative to the reference frame image in the scene monitoring area comprises:

counting, according to the image block definition evaluation value indicated by the first image block feature information at each image block location and the image block definition evaluation value indicated by the second image block feature information at each image block location, a number of first change blocks of the current frame image relative to the reference frame image in the scene monitoring area and a number of second change blocks of the current frame image relative to the reference frame image in the scene monitoring area, wherein the first change blocks comprise an image block where an image definition evaluation value becomes small, and the second change blocks comprise an image block where an image definition evaluation value becomes large; and calculating, according to the number of the first change blocks, the number of the second change blocks and a number of image blocks in the scene monitoring area, the change trend evaluation value of the current frame image relative to the reference frame image in the scene monitoring area.

17. The non-transitory computer-readable storage medium of claim 14, wherein determining, according to the image block change information, whether to trigger the focusing operation on the scene monitoring area comprises:

determining, according to the number of the change blocks indicated by the image block change information, whether the scene monitoring area satisfies a first focusing condition, wherein the first focusing condition is used for determining whether a change degree of a photographing picture in the scene monitoring area is obvious;

determining, according to the change trend evaluation value indicated by the image block change information, whether the scene monitoring area satisfies a second focusing condition, wherein the second focusing condition is used for determining whether a change trend of the photographing picture in the scene monitoring area is consistent; and determining, based on a determination result that the scene monitoring area satisfies both the first focusing condition and the second focusing condition, to trigger the focusing operation on the scene monitoring area.

\* \* \* \* \*